United States Patent
Inoue et al.

(10) Patent No.: US 6,762,872 B2
(45) Date of Patent: Jul. 13, 2004

(54) SPATIAL LIGHT MODULATOR (75) Inventors: Mitsuteru Inoue, Okazaki (JP); Jae Kyong Cho, Gyeongnam (KR)

(73) Assignee: Optware Corporation, Yokohama (JP)

( * ) Notice: Subject to any disclaimer, the term of this patent is extended or adjusted under 35 U.S.C. 154(b) by 0 days.

(21) Appl. No.: 10/308,897

(22) Filed: Dec. 3, 2002

(65) Prior Publication Data

US 2004/0036947 A1 Feb. 26, 2004

(51) Int. Cl.[7] .............................. G02F 1/09; G02B 5/30
(52) U.S. Cl. ...................................... 359/283; 359/484
(58) Field of Search ................................ 359/280–283, 359/483–485

(56) References Cited

U.S. PATENT DOCUMENTS

2004/0027968 A1 * 2/2004 Horimai ..................... 369/103

* cited by examiner

*Primary Examiner*—Georgia Epps
*Assistant Examiner*—William Choi
(74) *Attorney, Agent, or Firm*—Fenwick & West LLP (57) ABSTRACT

A spatial light modulator includes a device portion and a bias field applying coil disposed around the device portion. The device portion includes a magnetic layer and two types of conductor layers. The magnetic layer is made of a magneto-optic material and includes a plurality of pixels whose directions of magnetization are set independently of one another. Each of the pixels causes rotation of a direction of polarization of incident light depending on its direction of magnetization due to a magneto-optic effect. The conductor layers generate a magnetic field for setting the direction of magnetization of each of the pixels of the magnetic layer. Each of the pixels includes two regions which can take different states of magnetization. Information is produced by changing the states of magnetization in those regions.

3 Claims, 5 Drawing Sheets

SPATIAL LIGHT MODULATOR

This application claims priority to Japanese Patent Application NO. P2001-370613 filed on Dec. 4, 2001, the contents of which are hereby incorporated by reference.

FIELD OF THE INVENTION

The present invention relates to a spatial light modulator for spatially modulating incident light by utilizing a magneto-optic effect.

DESCRIPTION OF THE RELATED ART

A spatial light modulator for spatially modulating incident light is used in the field of optical information processing, computer-generated holograms or the like.

Conventional spatial light modulators include one in which a liquid crystal is used and one in which a micro-mirror device is used.

In the above-mentioned field of optical information processing, computer-generated holograms or the like, it is necessary that a large amount of information be processed at high speed, and therefore it is desirable that the spatial light modulator should have a high operation speed.

However, the spatial light modulator in which a liquid crystal is used has a low operation speed. For example, even in the case of using a ferroelectric liquid crystal that has a high operation speed among liquid crystals, the response time is on the order of microsecond.

The spatial light modulator in which a micro-mirror device is used can operate at a relatively high speed. However, the manufacturing cost for this spatial light modulator is high because it is a micro machine having a complicated structure which is manufactured by a highly-developed semiconductor manufacturing process. Moreover, there remains a problem in reliability because it has a mechanical driving portion.

For example, U.S. Pat. Nos. 4,584,237, 5,241,421, 5,255,119 and 5,386,313 disclose spatial light modulators for modulating incident light by utilizing a magneto-optic effect. Hereinafter, such a spatial light modulator is referred to as a magneto-optic spatial light modulator. The magneto-optic spatial light modulator includes a plurality of pixels, each of which is made of a magneto-optic material and capable of selecting a direction of magnetization independently. In the magneto-optic spatial light modulator, a direction of polarization of light passing through each pixel is rotated by a predetermined angle in a direction opposite to the direction of magnetization of the pixel due to the Faraday effect. Accordingly, the magneto-optic spatial light modulator produces spatially modulated light by arbitrarily selecting a direction of magnetization for each pixel.

Since the magneto-optic spatial light modulator exhibits a high speed in reversing the direction of magnetization of each pixel, it can achieve a higher operation speed on a pixel-by-pixel basis than that of a spatial light modulator in which a liquid crystal is used.

A conventional magneto-optic spatial light modulator emits two types of light which are different in direction of polarization. The two types of light, when passed through an analyzer, become two types of light having different light intensities. The two types of light having different light intensities are distinguishable from each other by comparing the intensities with a predetermined threshold value. There is a problem, however, in that the distinction method is susceptible to noise.

On the other hand, a technique is known in which 1-bit digital data "1" and "0" are expressed using two adjoining pixels of the spatial light modulator, and the data are distinguished by differentially detecting a difference in light intensity between two beams of light from the two adjoining pixels. However, since a single bit digital data is expressed using two pixels, the technique suffers from a problem that the amount of information producible by the spatial light modulator decreases to half that of the case where a single bit digital data is expressed using a single pixel.

OBJECT AND SUMMARY OF THE INVENTION

It is an object of the invention to provide a spatial light modulator for spatially modulating incident light by utilizing a magneto-optic effect, capable of generating spatially modulated light that is highly resistant to noise, without reducing the amount of information producible.

A spatial light modulator of the invention comprises:

a magnetic layer made of a magneto-optic material and including a plurality of pixels whose directions of magnetization are set independently of one another, each of the pixels causing rotation of a direction of polarization of incident light depending on its direction of magnetization due to a magneto-optic effect;

a plurality of soft magnetic layers located near the respective pixels, each of the soft magnetic layers being selectively magnetized in either of two opposite directions depending on a magnetic field from exterior; and a magnetic field generator for generating a magnetic field for setting the direction of magnetization of each of the soft magnetic layers, wherein each of the pixels includes two regions that take different states of magnetization when the soft magnetic layer nearby is magnetized, directions of magnetization in the two regions changing depending on the direction of magnetization of the soft magnetic layer.

According to the spatial light modulator of the invention, directions of magnetization of the soft magnetic layers are set by magnetic fields generated by the magnetic field generator. The two regions of each pixel take different states of magnetization when the soft magnetic layer near the pixel is magnetized. The directions of magnetization in the two regions change depending on the direction of magnetization in the soft magnetic layer. As a result, each pixel generates two types of light selectively.

In the spatial light modulator of the invention, the magnetic field generator may include a plurality of first conductor layers and a plurality of second conductor layers arranged to intersect each other at positions corresponding to the pixels, currents for generating the magnetic field for setting the direction of magnetization of each of the soft magnetic layers being passed through the first and second conductor layers.

The spatial light modulator of the invention may further comprise a bias field applying device that applies to the magnetic layer a bias magnetic field used for changing the direction of magnetization of each of the pixels.

Other objects, features and advantages of the invention will become sufficiently clear from the following description.

DETAILED DESCRIPTION OF THE PREFERRED EMBODIMENT

Figure 1:
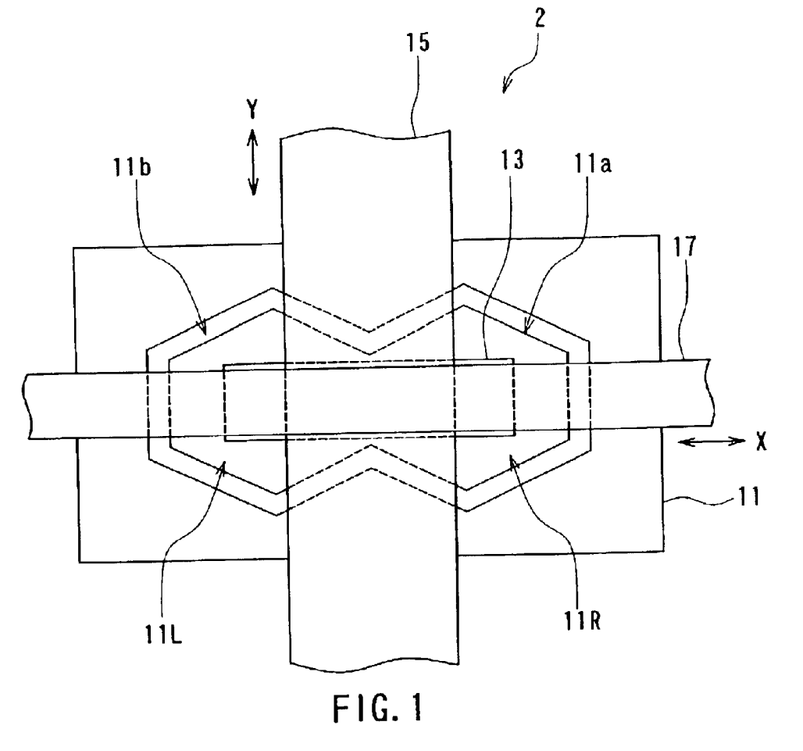
FIG. 1 is a plan view of a single pixel portion of a spatial light modulator according to an embodiment of the invention.
Figure 2:
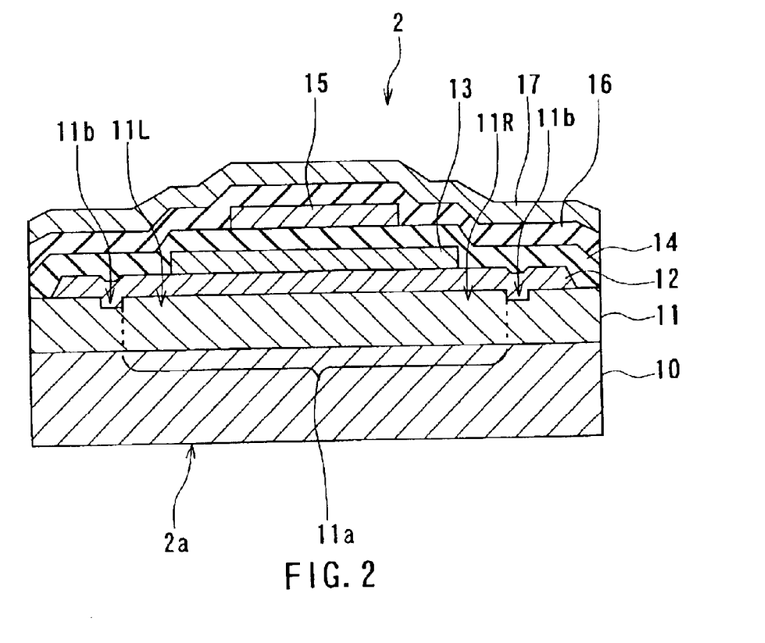
FIG. 2 is a cross-sectional view of the single pixel portion of the spatial light modulator according to the embodiment of the invention.
Figure 3:
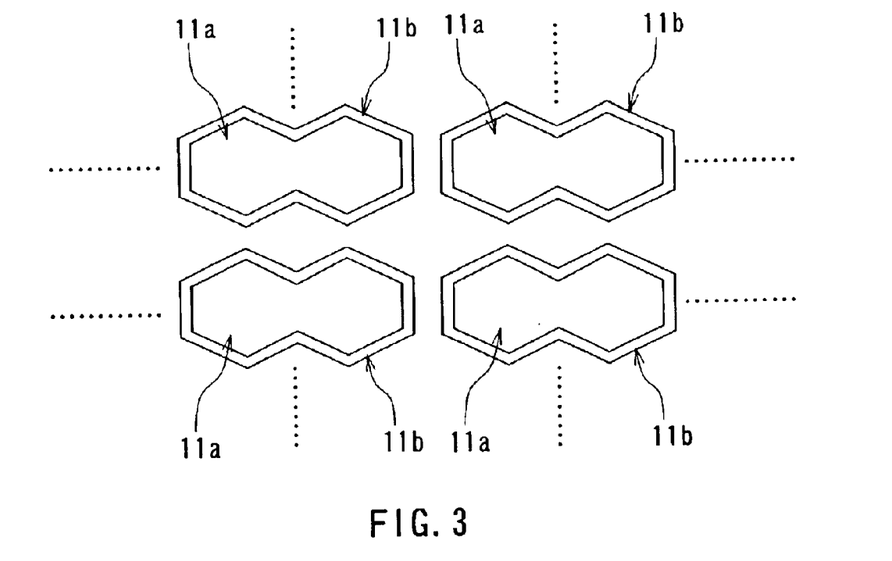
FIG. 3 is a plan view of the arrangement of the pixels in the spatial light modulator according to the embodiment of the invention.
Figure 4:
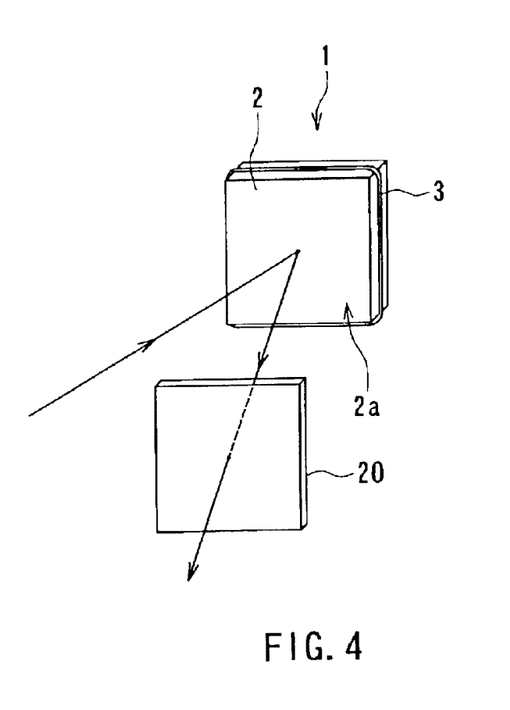
FIG. 4 is a perspective view conceptually illustrating the usage of the spatial light modulator according to the embodiment of the invention.
Figure 5:
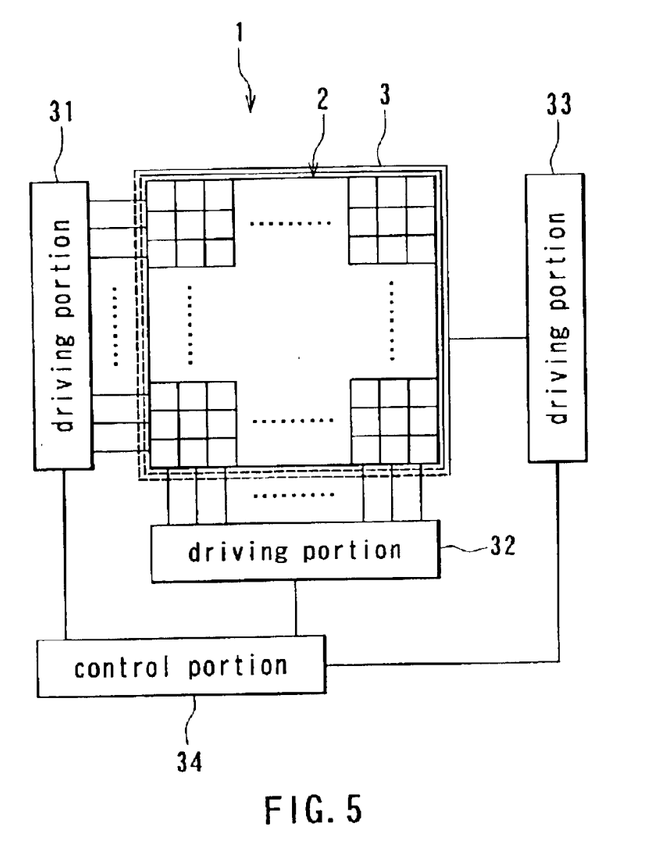
FIG. 5 is an explanatory diagram showing the spatial light modulator according to the embodiment of the invention and its peripheral circuits.

Hereinafter, an embodiment of the invention will be described in detail with reference to the drawings. Initially, reference is made to FIG. 1 through FIG. 5 to describe a configuration of a spatial light modulator according to the embodiment. FIG. 1 is a plan view of a single pixel portion of the spatial light modulator according to the embodiment. FIG. 2 is a cross-sectional view of the single pixel portion of the spatial light modulator according to the embodiment. FIG. 3 is a plan view of the arrangement of the pixels in the spatial light modulator according to the embodiment. FIG. 4 is a perspective view conceptually illustrating the usage of the spatial light modulator according to the embodiment. FIG. 5 is an explanatory diagram showing the spatial light modulator according to the embodiment and its peripheral circuits.

As shown in FIG. 4, the spatial light modulator 1 according to the embodiment comprises a device portion 2 and a bias field applying coil 3 disposed around the device portion 2. The device portion 2 is plate-shaped, and one of surfaces thereof serves as a light incidence/outgoing surface 2a. The bias field applying coil 3, when a current is passed therethrough, generates a bias magnetic field in a direction perpendicular to the incidence/outgoing surface 2a, and applies the bias magnetic field to the device portion 2. The bias field applying coil 3 corresponds to the bias field applying device of the invention. Light incident on the device portion 2 is spatially modulated by the device portion 2 and exits therefrom. As shown in FIG. 4, the light that has exited the device portion 2 may be allowed to pass through an analyzer 20 before use.

As shown in FIG. 1 through FIG. 3, the device portion 2 has a substrate 10 and a magnetic layer 11 formed on the substrate 10. The magnetic layer 11 is made of a magneto-optic material and includes a plurality of pixels 11a whose directions of magnetization are set independently of one another. Each of the pixels 11a causes rotation of the direction of polarization of incident light depending on its direction of magnetization due to a magneto-optic effect. The bias field applying coil 3 applies to the magnetic layer 11 a bias magnetic field used for changing the direction of magnetization of each of the pixels 11a.

The device portion 2 further has a plurality of reflecting layers 12 for reflecting light that are formed on the pixels 11a of the magnetic layer 11, a plurality of soft magnetic layers 13 formed on the reflecting layers 12, and an insulating layer 14 that covers the reflecting layers 12 and the soft magnetic layers 13.

The soft magnetic layers 13 each have a shape that is long in horizontal direction in FIG. 1 and FIG. 2. Hence, the soft magnetic layers 13 are apt to be magnetized either leftward or rightward in FIG. 1 and FIG. 2. The soft magnetic layers 13 are located near the respective pixels 11a, and are selectively magnetized in either of two opposite directions, i.e., leftward or rightward in FIG. 1 and FIG. 2, depending on a magnetic field from exterior.

The device portion 2 further has a plurality of conductor layers 15 formed on the insulating layer 14, an insulating layer 16 that covers the conductor layers 15, and a plurality of conductor layers 17 formed on the insulating layer 16. The conductor layers 15 extend in one direction (hereinafter referred to as Y direction) and are arranged at regular intervals. The conductor layers 17 extend in a direction orthogonal to the Y direction (hereinafter referred to as X direction) and are arranged at regular intervals. The reflecting layers 12 and the insulating layers 14, 16 are omitted in FIG. 1.

The plurality of conductor layers 15 and the plurality of conductor layers 17 are arranged to intersect each other at positions corresponding to the individual pixels 11a, so that currents for generating a magnetic field for setting the direction of magnetization of each of the pixels 11a are passed therethrough. Passing the currents through the conductor layers 15 and 17 generates the magnetic field for setting the direction of magnetization of each of the pixels 11a and for setting the direction of magnetization of each of the soft magnetic layers 13.

The conductor layers 15 correspond to the first conductor layers of the invention. The conductor layers 17 correspond to the second conductor layers of the invention. The conductor layers 15 and the conductor layers 17 correspond to the magnetic field generator of the invention.

As shown in FIG. 2, the magnetic layer 11 has a top surface, a bottom surface, and grooves 11b for defining the borders of the individual pixels 11a. The grooves 11a are formed to extend from the top surface to a predetermined position between the top and bottom surfaces. The grooves 11b are formed all around the individual pixels 11a. The grooves 11b do not penetrate the magnetic layer 11. The grooves 11b may have any depth, such as 30% to 50% the thickness of the magnetic layer 11. The grooves 11b inhibit magnetic walls from moving beyond the grooves 11b. The reflecting layers 12 are arranged to cover the grooves 11b.

The substrate 10 is made of gadolinium gallium garnet (GGG), for example. The magnetic layer 11 is formed of a magnetic garnet thin film, for example. Rare-earth iron garnet, bismuth-substituted rare-earth iron garnet or the like is used as the material of the magnetic layer 11. The magnetic layer 11 may be formed by forming a monocrystalline magnetic garnet thin film by a liquid-phase epitaxy (LPE) method or a sputtering method. The grooves 11b of the magnetic layer 11 are formed by etching, for example.

The reflecting layers 12 are made of Al, for example. The soft magnetic layers 13 are made of Permalloy (NiFe), for example. The insulating layers 14 and 16 are made of $SiO_2$, for example. The conductor layers 15 and 17 are made of Al, for example.

As shown in FIG. 1, in this embodiment, each pixel 11a has a shape that is long in the X direction. Each pixel 11a includes a region 11L that lies on the left in FIG. 1 and a region 11R that lies on the right in FIG. 1. More specifically, in this embodiment, each pixel 11a has a shape of two hexagons adjoining in the X direction. Nevertheless, the shape of the pixels 11a is not limited thereto but may be rectangular or elliptic.

The regions 11L and 11R take different states of magnetization when the soft magnetic layer 13 near the pixel 11a is magnetized. The directions of magnetization in the regions 11L and 11R change depending on the direction of magnetization of the soft magnetic layer 13.

The soft magnetic layers 13 each have a shape that is long in the X direction. In this embodiment, the conductor layers 15 are made greater than the conductor layers 17 in width to conform to the shape of the soft magnetic layers 13.

In the device portion 2, the bottom surface of the substrate 10 is the light incidence/outgoing surface 2a. Light enters the substrate 10 from the incidence/outgoing surface 2a, passes through the substrate 10 and the magnetic layer 11, is reflected by the reflecting layers 12, passes through the magnetic layer 11 and the substrate 10 again, and exits from the incidence/outgoing surface 2a. The substrate 10 and the magnetic layer 11 have transparency at least to the light to be used.

Next, drivers of the spatial light modulator 1 according to the embodiment will be described with reference to FIG. 5. As shown in FIG. 5, the plurality of conductor layers 17 of the device portion 2 are connected to a driving portion 31, and the plurality of conductor layers 15 are connected to a driving portion 32. The bias field applying coil 3 is connected to a driving portion 33. The driving portions 31, 32, and 33 are controlled by a control portion 34. Under the control of the control portion 34, the driving portions 31 and 32 feed positive or negative pulsed currents to the conductor layers 17 and 15, respectively. The driving portion 31 contains a plurality of driving circuits for feeding positive or negative pulsed currents to the plurality of conductor layers 17. Similarly, the driving portion 32 contains a plurality of driving circuits for feeding positive or negative pulsed currents to the plurality of conductor layers 15. The driving portion 33 feeds a positive or negative arbitrary current to the coil 3.

Description will now be given of functions of the spatial light modulator 1 according to the embodiment. In the following description, a bias magnetic field is represented by the symbol Hb. The bias magnetic field Hb is shown in a positive value when it is upward in FIG. 2. The bias magnetic field Hb is shown in a negative value when it is downward in FIG. 2. A current flowing through each of the conductor layers 17 is represented by the symbol Ix. The current Ix is shown in a positive value when it flows from the left to the right in FIG. 1. The current Ix is shown in a negative value when it flows from the right to the left in FIG. 1. A current flowing through each of the conductor layers 15 is represented by the symbol Iy. The current Iy is shown in a positive value when it flows from the bottom to the top in FIG. 1. The current Iy is shown in a negative value when it flows from the top to the bottom in FIG. 1.

In this embodiment, direction of magnetization of a pixel 11a can be uniformized over an entire region thereof. As will be detailed later, in this embodiment, the region 11L and the region 11R of a pixel 11a can take different states of magnetization. Then, in this embodiment, a pixel 11a can be set to either of the following first and second states selectively. In the first state, in the region 11L an area where the direction of magnetization contains upward components is wider than an area where the direction of magnetization contains downward components, while in the region 11R an area where the direction of magnetization contains downward components is wider than an area where the direction of magnetization contains upward components. In the second state, in the region 11L the area where the direction of magnetization contains downward components is wider than the area where the direction of magnetization contains upward components, while in the region 11R the area where the direction of magnetization contains upward components is wider than the area where the direction of magnetization contains downward components.

For example, in this embodiment, the first state and the second state of a pixel 11a are associated with 1-bit digital data "1" and "0", respectively. A pixel 11a thus expresses a single bit digital data.

Figure 6:
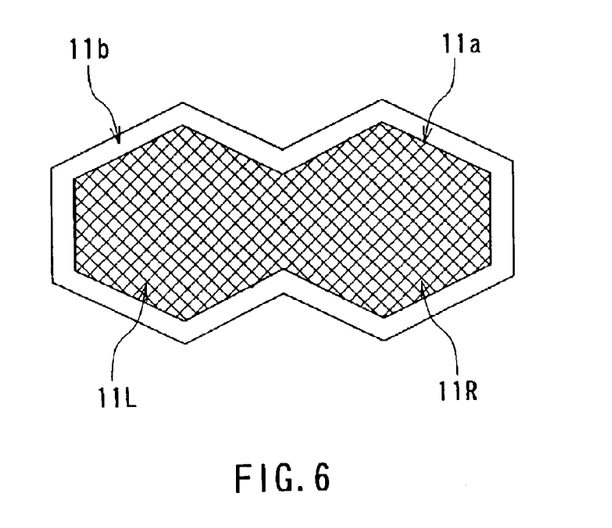
FIG. 6 is an explanatory diagram for explaining the operation of the spatial light modulator according to the embodiment of the invention.
Figure 7:
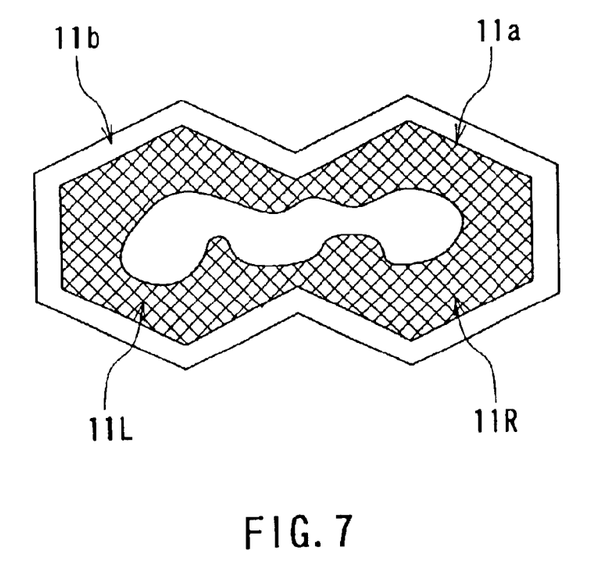
FIG. 7 is an explanatory diagram for explaining the operation of the spatial light modulator according to the embodiment of the invention.
Figure 8:
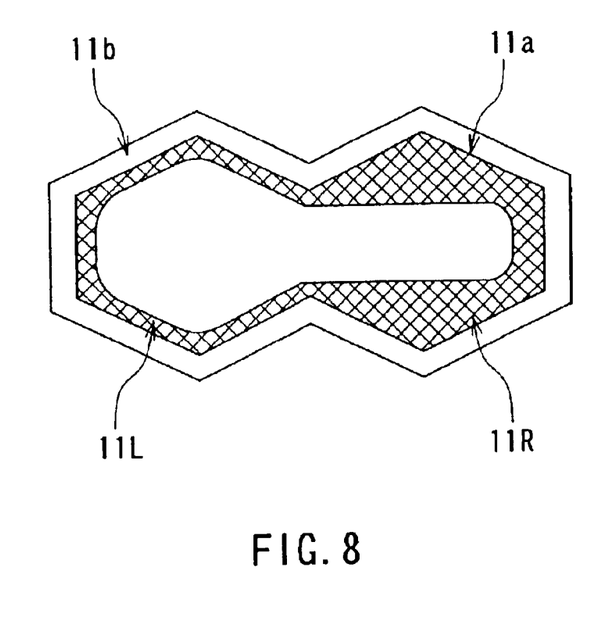
FIG. 8 is an explanatory diagram for explaining the operation of the spatial light modulator according to the embodiment of the invention.

An operation of the spatial light modulator 1 for the case of bringing a pixel 11a into the first state will now be described with reference to FIG. 6 through FIG. 8. In FIG. 6 through FIG. 8, the hatched area in the pixel 11a represents the area where the direction of magnetization contains downward components. The unhatched area represents the area where the direction of magnetization contains upward, components. The presence or absence of hatching in FIG. 6 through FIG. 8 simply indicates whether the direction of magnetization contains downward components or upward components, not that the direction of magnetization is completely downward or upward.

In the operation, first, the bias field applying coil 3 applies a bias magnetic field Hb having a negative value to the device portion 2 and then makes the bias magnetic field Hb "0". In this process, the currents Ix and Iy are both kept at "0". For example, the value of the bias magnetic field Hb to be initially applied to the device portion 2 is −62 Oe (=−62×79 A/m). Through this operation, as shown in FIG. 6, the pixel 11a is brought into a state where the direction of magnetization contains downward components over the entire region of the pixel 11a.

Next, the bias field applying coil 3 applies a bias magnetic field Hb having a positive value to the device portion 2 and then makes the bias magnetic field Hb "0". In this process, the current Ix is set at a positive value and the current Iy a negative value. For example, the current Ix is set at +100 mA and the current Iy −100 mA. For example, the value of the bias magnetic field Hb to be initially applied to the device portion 2 is +30 Oe (=+30×79 A/m). Through this operation, as shown in FIG. 7, a magnetic domain where the direction of magnetization contains upward components is produced within the area of the pixel 11a where the direction of magnetization contains downward components. At this time, a magnetic field caused by the currents Ix and Iy is applied to the soft magnetic layer 13. As a result, the direction of magnetization of the soft magnetic layer 13 turns rightward.

Next, the bias field applying coil 3 applies a bias magnetic field Hb having a positive value to the device portion 2. The value of this bias magnetic field Hb is +23 Oe (=+23×79 A/m), for example. In this process, the currents Ix and Iy are both set at "0". This bias magnetic field Hb causes expansion of the magnetic domain where the direction of magnetization contains upward components. Here, since the direction of magnetization of the soft magnetic layer 13 is rightward, the magnetic domain where the direction of magnetization contains upward components is wider in the left in the pixel 11a as shown in FIG. 8. As a result, the pixel 11a is brought into the first state in which in the region 11L the area where the direction of magnetization contains upward components is wider than the area where the direction of magnetization contains downward components, while in the region 11R the area where the direction of magnetization contains downward components is wider than the area where the direction of magnetization contains upward components. While the magnetic domain expands, the groove 11b inhibits the movement of the magnetic walls.

Figure 9:
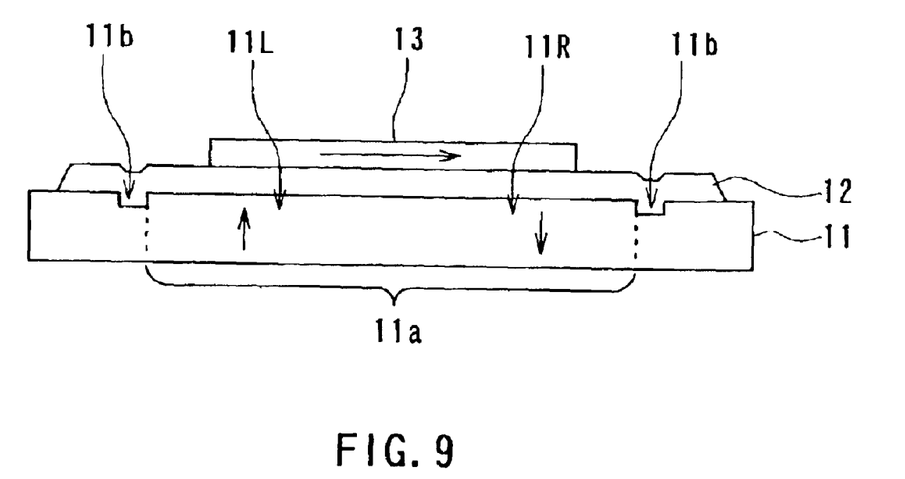
FIG. 9 is an explanatory diagram conceptually illustrating the state of magnetization of the pixel and that of the soft magnetic layer in the state shown in FIG. 8.

FIG. 9 conceptually illustrates the state of magnetization of the pixel 11a and that of the soft magnetic layer 13 in the state shown in FIG. 8. As shown in FIG. 9, when the direction of magnetization of the soft magnetic layer 13 is rightward, the direction of magnetization in the region 11L tends to be upward and the direction of magnetization in the region 11R tends to be downward. Consequently, the above-described first state is established.

Figure 10:
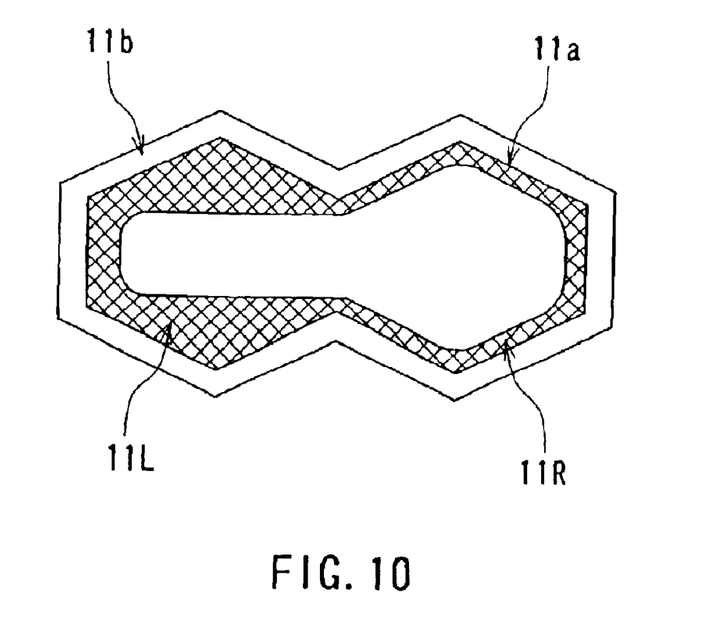
FIG. 10 is an explanatory diagram for explaining the operation of the spatial light modulator according to the embodiment of the invention.

In the operation described above, if the current Iy used in generating the magnetic domain where the direction of magnetization contains upward components is set at a positive value such as +100 mA while the remainder of the operation are unchanged from the above description, the direction of magnetization of the soft magnetic layer 13 turns leftward and the pixel 11a is thereby brought into the second state. In the second state, as shown in FIG. 10, in the region 11L the area where the direction of magnetization contains downward components is wider than the area where the direction of magnetization contains upward components, while in the region 11R the area where the direction of magnetization contains upward components is wider than the area where the direction of magnetization contains downward components. In FIG. 10, the hatched area in the pixel 11a represents the area where the direction of magnetization contains downward components, and the unhatched area represents the area where the direction of magnetization contains upward components.

In this way, according to the spatial light modulator 1 of the embodiment, it is possible to set the individual pixels 11a selectively to either the first state or the second state independently of one another by controlling the currents Ix and Iy respectively for each of the conductor layers 17 and each of the conductor layers 15.

It is still possible to set the individual pixels 11a selectively to either the first state or the second state even when the polarity of the bias magnetic field and the polarities of the currents in the above-described operation are all inverted from those described above.

Light that is incident on the device portion 2 of the spatial light modulator 1 passes through the substrate 10 and then through the magnetic layer 11. The light passing through the magnetic layer 11 is subjected to Faraday rotation, that is, rotation of the direction of polarization depending on a direction of magnetization of the magnetic layer 11 due to the Faraday effect. In the following description, it is assumed that the direction of polarization of light passing through areas of the magnetic layer 11 where the direction of magnetization is upward in FIG. 2 is rotated by $+\theta_F$, while the direction of polarization of light passing through areas of the magnetic layer 11 where the direction of magnetization is downward in FIG. 2 is rotated by $-\theta_F$.

The light having passed through the magnetic layer 11 is reflected by the reflecting layers 12, passes through the magnetic layer 11 and the substrate 10 again, and exits the device portion 2. The light that passes through the magnetic layer 11 after being reflected by the reflecting layers 12 is subjected to rotation of the direction of polarization depending on the direction of magnetization of the magnetic layer 11 due to the Faraday effect, as is the case where the light passes through the magnetic layer 11 before reaching the reflecting layers 12. As a result, the direction of polarization of light exiting the device portion 2 after passing through the magnetic layer 11 twice, i.e., forward and backward, at the areas where the direction of magnetization is upward, is rotated by $+2\theta_F$. The direction of polarization of light exiting the device portion 2 after passing through the magnetic layer 11 twice, forward and backward, at the areas where the direction of magnetization is downward is rotated by $-2\theta_F$.

In this embodiment, the pixels 11a of the magnetic layer 11 each have the two regions 11L and 11R. The embodiment allows the individual pixels 11a to be selectively set to either the first state or the second state independently of one another.

In the first state, light that is incident on the device portion 2 and passes through the regions 11L twice, i.e., forward and backward, to exit the device portion 2 contains a larger amount of light whose direction of polarization is rotated by $+2\theta_F$, while light that is incident on the device portion 2 and passes through the regions 11R twice, i.e., forward and backward, to exit the device portion 2 contains a larger amount of light whose direction of polarization is rotated by $-2\theta_F$.

In the second state, light that is incident on the device portion 2 and passes through the regions 11L twice, i.e., forward and backward, to exit the device portion 2 contains a larger amount of light whose direction of polarization is rotated by $-2\theta_F$, while light that is incident on the device portion 2 and passes through the regions 11R twice, i.e., forward and backward, to exit the device portion 2 contains a larger amount of light whose direction of polarization is rotated by $+2\theta_F$.

Hereinafter, light that is incident on the device portion 2 and passes through a pixel 11a of the first state twice, i.e., forward and backward, to exit the device portion 2 will be referred to as first-state light. Light that is incident on the device portion 2 and passes through a pixel 11a of the second state twice, i.e., forward and backward, to exit the device portion 2 will be referred to as second-state light. The first-state light and the second-state light both include two parts having different directions of polarization. The first-state light and the second-state light are reverse to each other in the positional relationship between the two parts.

When passed through the analyzer 20, the first-state light and the second-state light that have exited the device portion 2 each become light that includes two parts having different light intensities, as shown in FIG. 4. However, the first-state light and the second-state light having passed through the analyzer 20 are reverse to each other in the positional relationship between the two parts of different light intensities. The first-state light and the second-state light having passed through the analyzer 20 are distinguishable form each other by differentially detecting a difference in light intensity between the two parts. Such distinction between the two types of light through differential detection is less susceptible to noise as compared to a distinction between two types of light which are simply different in intensity.

As described above, in the spatial light modulator 1 of the embodiment, each single pixel 11a has two regions 11L and 11R which can take different states of magnetization. In this embodiment, the individual pixels 11a can be selectively set to either the first state or the second state independently of one another. Thus, according to the embodiment, by selectively setting each pixel 11a to either the first state or the second state, each pixel 11a can generate two types of light that are distinguishable through differential detection. As a result, according to the spatial light modulator 1 of the embodiment, it is possible to generate spatially modulated light that is highly resistant to noise, with a simple configuration and without reducing by half the amount of producible information.

In this embodiment, the magnetic layer 11 has the grooves 11b for defining the borders of the individual pixels 11a. The grooves 11b are formed to extend from the top surface of the magnetic layer 11 to a predetermined position between the top and bottom surfaces thereof. Thus, in this embodiment, the magnetic layer 11 is not completely divided into the individual pixels 11a but continuous over the plurality of pixels 11a. Experiments conducted by the inventors have shown that the configuration of the magnetic layer 11 of this embodiment can lower the magnetic field required for reversing the directions of magnetization of the pixels 11a as compared to the case where the magnetic layer is completely divided into pixels.

An example of the experiments will now be described. In the experiments, a 3-$\mu$m-thick magnetic layer was used to prepare first to third samples. For the first sample, pixels were defined by grooves having a depth of 30% the thickness of the magnetic layer. For the second sample, pixels were defined by grooves having a depth of 50% the thickness of the magnetic layer. For the third sample, the magnetic layer was completely divided into pixels. Each of the samples was measured for the intensity of a magnetic field required for reversing the directions of magnetization of the pixels. As a result, the intensities of the magnetic fields required for reversing the directions of magnetization of the pixels were 36 Oe (=36×79 A/m) for the first sample, 62 Oe (=62×79 A/m) for the second sample, and 280 Oe (=280×79 A/m) for the third sample. It can be seen from the results that the configuration of the magnetic layer 11 of the embodiment can lower the magnetic field required for reversing the directions of magnetization of the pixels 11a as compared to the case where the magnetic layer is completely divided into pixels.

The reason that the configuration of the magnetic layer 11 of the embodiment can lower the magnetic field required for reversing the directions of magnetization of the pixels 11a is considered to be as follows. In this embodiment, the magnetic layer 11 establishes coupling between adjoining two pixels 11a. Thus, even when the directions of magnetization are different between adjoining two pixels 11a, the portion of the magnetic layer 11 lying between the two pixels 11a can be magnetized in a direction intermediate between the two directions of magnetization of the two pixels 11a. This facilitates changes of the directions of magnetization of the pixels 11a.

Thus, according to the embodiment, it is possible to lower the magnetic field required for reversing the directions of magnetization of the pixels 11a. This makes it possible to reduce the driving currents of the spatial light modulator 1.

The grooves 11b of the embodiment are shallower than grooves that would be formed between pixels in the case where the magnetic layer is completely divided into the pixels. According to the embodiment, it is therefore possible to form another layer on the magnetic layer 11 without filling the grooves 11b with an insulating material. Alternatively, according to the embodiment, the grooves 11b can be easily filled with an insulating material if necessary before another layer is formed on the magnetic layer 11. According to the embodiment, it is also easy to form the grooves 11b.

Thus, the embodiment provides the spatial light modulator 1 that is simple in structure and easy to fabricate and drive.

The invention is not limited to the foregoing embodiment, and various modifications may be made thereto.

As has been described, according to the spatial light modulator of the invention, the two regions of each pixel take different states of magnetization when the soft magnetic layer near the pixel is magnetized. The directions of magnetization in the two regions change depending on the direction of magnetization in the soft magnetic layer. Thus, each single pixel can selectively generate two types of light which are distinguishable from each other by differential detection. According to the invention, it is therefore possible to generate spatially modulated light that is highly resistant to noise, without reducing the amount of information producible.

It is apparent from the foregoing description that the invention may be carried out in various modes and may be modified in various ways. It is therefore to be understood that within the scope of equivalence of the following claims the invention may be practiced in modes other than the foregoing embodiment.

What is claimed is:

1. A spatial light modulator comprising:

a magnetic layer made of a magneto-optic material and including a plurality of pixels whose directions of magnetization are set independently of one another, each of the pixels causing rotation of a direction of polarization of incident light depending on its direction of magnetization due to a magneto-optic effect;

a plurality of soft magnetic layers located near the respective pixels, each of the soft magnetic layers being selectively magnetized in either of two opposite directions depending on a magnetic field from exterior; and a magnetic field generator for generating a magnetic field for setting the direction of magnetization of each of the soft magnetic layers, wherein each of the pixels includes two regions that take different states of magnetization when the soft magnetic layer nearby is magnetized, directions of magnetization in the two regions changing depending on the direction of magnetization of the soft magnetic layer.

2. A spatial light modulator according to claim 1, wherein the magnetic field generator includes a plurality of first conductor layers and a plurality of second conductor layers arranged to intersect each other at positions corresponding to the pixels, currents for generating the magnetic field for setting the direction of magnetization of each of the soft magnetic layers being passed through the first and second conductor layers.

3. A spatial light modulator according to claim 1, further comprising a bias field applying device that applies to the magnetic layer a bias magnetic field used for changing the direction of magnetization of each of the pixels.

* * * * *

UNITED STATES PATENT AND TRADEMARK OFFICE
CERTIFICATE OF CORRECTION

PATENT NO. : 6,762,872 B2  Page 1 of 1
DATED : July 13, 2004
INVENTOR(S) : Mitsuteru Inoue and Kyong Cho It is certified that error appears in the above-identified patent and that said Letters Patent is hereby corrected as shown below:

<u>Title page,</u>
Insert Item -- [30] Foreign Application Priority Data
Dec. 4, 2001   (JP)…………..2001-37613 --

Signed and Sealed this

Ninth Day of August, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,762,872 B2 |
| DATED | : July 13, 2004 |
| INVENTOR(S) | : Mitsuteru Inoue and Kyong Cho |

Page 1 of 1

It is certified that error appears in the above-identified patent and that said Letters Patent is hereby corrected as shown below:

<u>Title page,</u>
Insert Item -- [30] Foreign Application Priority Data
          Dec. 4, 2001  (JP).........2001-370613 --.

This certificate supersedes Certificate of Correction issued August 9, 2005.

Signed and Sealed this

Thirty-first Day of January, 2006

JON W. DUDAS
*Director of the United States Patent and Trademark Office*